(12) United States Patent
Watson et al.

(10) Patent No.: US 10,893,309 B2
(45) Date of Patent: Jan. 12, 2021

(54) METHOD AND APPARATUS FOR AUTOMATIC HLS BITRATE ADAPTATION

(71) Applicant: ARRIS Enterprises LLC, Suwanee, GA (US)

(72) Inventors: William S. Watson, Mission Viejo, CA (US); Kuang Ming Chen, San Diego, CA (US); Nick Baciu, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/232,252

(22) Filed: Dec. 26, 2018

(65) Prior Publication Data

US 2020/0213640 A1    Jul. 2, 2020

(51) Int. Cl.
| | | |
|---|---|---|
| H04N 7/173 | (2011.01) | |
| H04N 21/2387 | (2011.01) | |
| H04N 21/2662 | (2011.01) | |
| H04N 21/643 | (2011.01) | |
| H04N 21/262 | (2011.01) | |

(52) U.S. Cl.
CPC ..... *H04N 21/2387* (2013.01); *H04N 21/2662* (2013.01); *H04N 21/26283* (2013.01); *H04N 21/643* (2013.01)

(58) Field of Classification Search
CPC ......... H04N 21/2387; H04N 21/26283; H04N 21/2662; H04N 21/643
See application file for complete search history.

(56) References Cited

U.S. PATENT DOCUMENTS

| | | | |
|---|---|---|---|
| 2012/0059951 A1* | 3/2012 | Gutarin | H04L 47/2416 709/233 |
| 2013/0326024 A1* | 12/2013 | Chen | H04L 65/4084 709/219 |

* cited by examiner

*Primary Examiner* — Mulugeta Mengesha
(74) *Attorney, Agent, or Firm* — Chernoff, Vilhauer, McClung & Stenzel, LLP (57) ABSTRACT

A media player system is provided for receiving and processing a media program that uses a time interval interval to required to decode $N_D$ frames of the media program segment. The media system receives the requested media program segment, processes the segment and determines if the throughput of the media program differs from the desired presentation throughput by a tolerance amount. Both decoding and rendering performance are determined and used to determine presentation throughput, and to determine if heavier or lighter variants of the media program should be requested for subsequent media program segments.

15 Claims, 10 Drawing Sheets

METHOD AND APPARATUS FOR AUTOMATIC HLS BITRATE ADAPTATION

BACKGROUND

Field

The present disclosure relates to systems and methods for receiving and presenting media programs, and in particular to a method and apparatus for adaptively requesting, receiving processing and presenting such media programs.

Description of the Related Art

Quality of media playback across a network is dependent upon the client being able to retrieve chunks of media, decode the individual media streams, and render them in real time. There are many factors that can affect the client's ability to ultimately render the media satisfactorily. Typically, network throughput is determined and used to select the appropriate stream. Network throughput is not the only limiting factor involved in media playback.

HTTP Live Streaming (HLS) enables media playback over a network by breaking down a program into digestible segments of media data and providing a means by which the client can query the available segments, download, and render the individual segments. Additionally, HLS provides a mechanism for publishing chunks of varying resolution, advertised as the number of bits per second required to render the media. Client applications have typically determined the available throughput of the network and selected the highest bitrate available that can be downloaded for the given throughput. However, network throughput or bandwidth is only one of the factors impacting media playback quality.

What is needed is a system and method for that improves media playback quality by measuring or predicting other factors that affect playback quality and requesting segments of suitable size to assure that playback quality is maximized. The methods and systems described herein satisfy that need.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for processing a media program. In one instance, the media program comprises a plurality of media program versions, each of the plurality of media program versions generated for a different presentation throughput than the other of the plurality of media program versions, each of the plurality of media program versions comprising a plurality of media program version segments. The method comprises transmitting a request for the media program, receiving a master playlist for the requested media program, the master playlist comprising an index to plurality of media playlists, each media playlist having an address to each of a plurality of media program segments of a related variant of the media program suitable for a first presentation throughput, the first presentation throughput comprising a first communication throughput and a first processing throughput. The method also includes transmitting a request for a media program segment of the plurality of media program segments of a first variant of the media program, receiving the requested media program segment, processing the received media program segment, and determining a presentation throughput of the received media program segment, determining the presentation throughput at least in part from the determined decoding performance and the determined rendering performance, and determining if the presentation throughput of the received media program segment is less than a desired presentation throughput. If the determined presentation throughput of the received media program segment differs from than the desired presentation throughput by greater than a tolerance amount, a request is transmitted for a temporally following media program segment of another variant of the media program suitable for the determined presentation throughput. If, however, the determined presentation throughput of the received media program segment does not differ from the desired presentation throughput by more than the tolerance amount, a request is transmitted for a temporally following media program segment of the same variant of the media program suitable for the determined presentation throughput. In one embodiment, the presentation throughput of the media program segment is determined by determining a decoding performance of the received media program segment, determining a rendering performance of the received media program segment; and determining the presentation throughput at least in part from the determined decoding performance and the determined rendering performance. Another embodiment is evidenced by an apparatus comprising a processor and a memory storing instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized, and structural changes may be made without departing from the scope of the present disclosure.

Overview

There are many additional factors that can have serious impact on the quality of media playback. These include but are not limited to (1) decode performance (2) render performance, (3) player overhead and (4) PC/System overhead. Each of these by itself can have a dramatic affect on performance. Network throughput alone is not a good measure of whether a client will be able to play back a particular bitrate well. Disclosed below is a system and method that maintains and constantly monitors other contributing factors, as well as monitors ongoing playback performance to determine the optimal bitrate for playback on the system.

Figure 1:
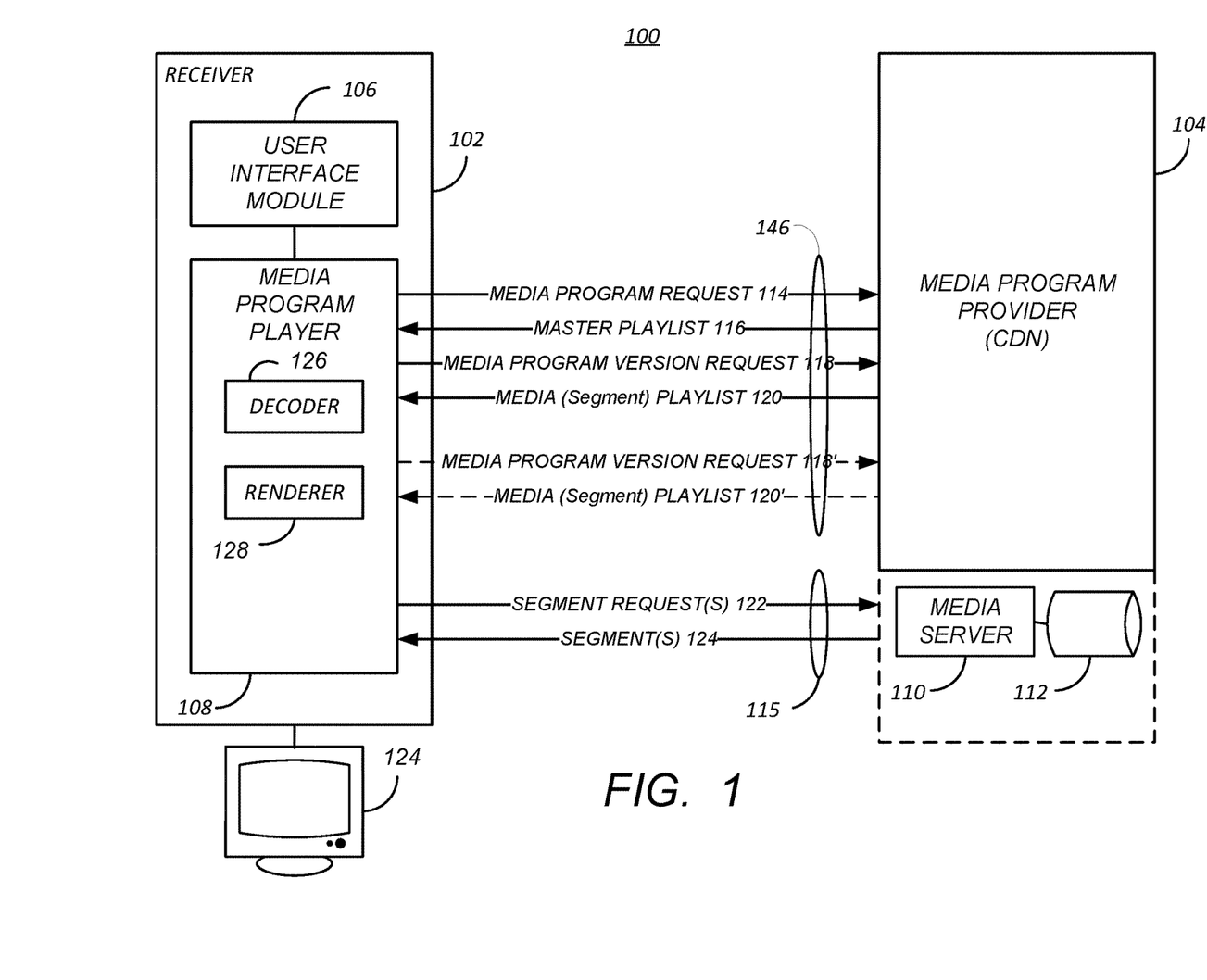
FIG. 1 is a diagram depicting one embodiment of a content distribution system.

FIG. 1 is a diagram depicting one embodiment of a content distribution system 100 (CDS). The depicted CDS 100 comprises a receiver 102 communicating with a media program provide or content distribution network (CDN) 104. The receiver 102 comprises a media program player (MPP) 108 communicatively coupled to a user interface module 106. The user interface module 106 accepts user commands and provides such commands to the MPP 108. The user interface module 106 also receives information from the MPP 108 including information for presenting options and controls to the user and media programs to be displayed. A media server 110 communicatively coupled to storage device 112 provides media programs to the receiver 102 as further described below. As illustrated, the media server 110 and storage 112 may be part of the CDN 104 or a separate entity such as AKAMAI. The receiver 102 may be embodied in a device known as a set-top-box (STB), integrated receiver/decoder, tablet computer, desktop/laptop computer, or smartphone.

In one embodiment, the media program is provided to the receiver 102 using hypertext transfer protocol (HTTP) live streaming (HLS). HLS is a technology for streaming on-demand audio and video to receivers 102 such as cellphones, tablet computers, televisions, and set top boxes. HLS streams behave like regular web traffic, and adapts to variable network conditions, dynamically adjusting playback to match the available speed of wired and wireless communications.

Figure 2:
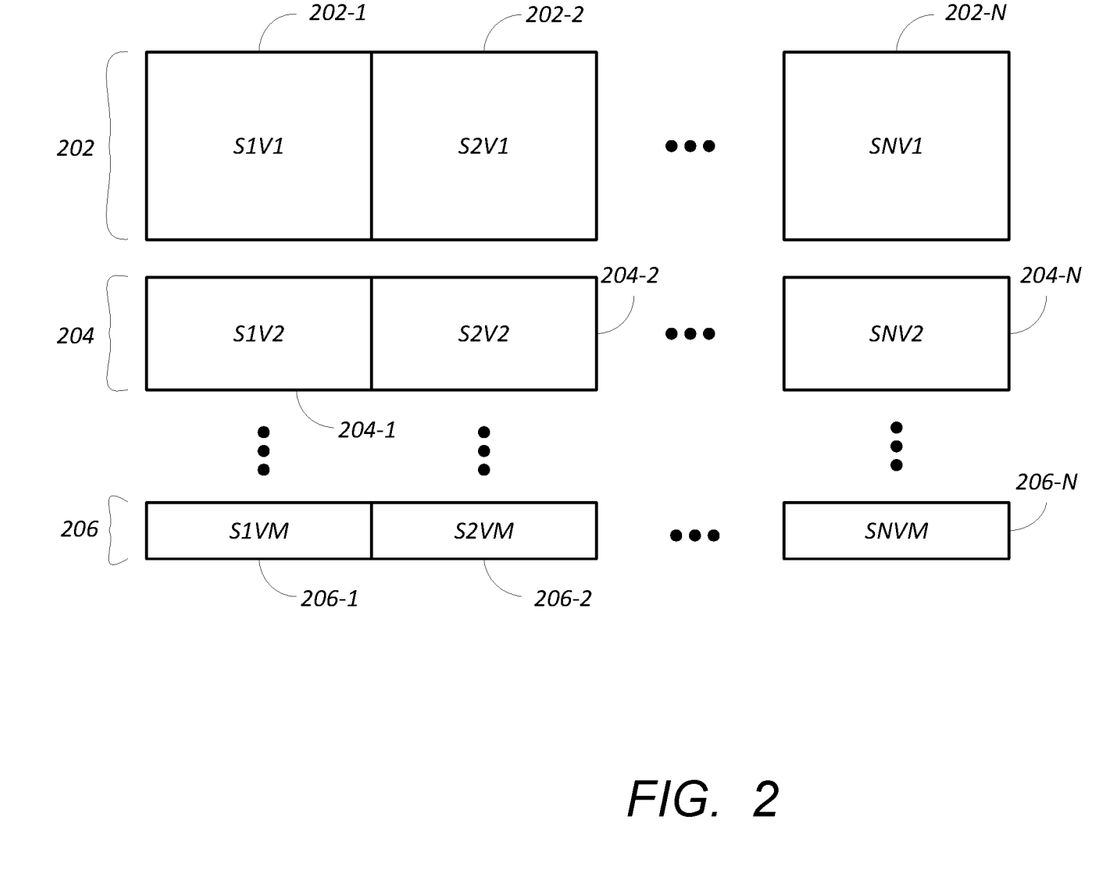
FIG. 2 is a diagram illustrating a representation of an HLS-encoded video program.

FIG. 2 is a diagram illustrating a representation of an HLS-encoded video program. In a typical HLS workflow, a video encoder that supports HLS receives a live video feed or distribution-ready media file. The encoder creates multiple versions (known as variants) of the audio/video at different bit rates, resolutions, and quality levels. In the embodiment illustrated in FIG. 2, M versions of the media program are created, with "V1" indicating the first version of the media program 202, "V2" indicating the second version of the media program 204 and "VM" indicating the $M^{th}$ version of the media program 206.

The encoder then segments the variants 202-206 into a series of small files, called media segments or chunks. In the illustrated embodiment, the first version of the media program 202 is segmented into N segments S1, S2, . . . , SN of equivalent temporal length. The N segments of version one of the media program are denoted as S1V1 202-1, S2V1 202-2, . . . , SNV1 202-N, respectively, the N segments of version two of the media program are denoted as S1V2 204-1, S2V2 204-2, . . . , SNV2 204-N, respectively, and the N segments of version M of the media program are denoted as S1VM 206-1, S2VM 206-2, . . . , SNVM 206-N, respectively.

At the same time, the encoder creates a media playlist file for each variant 202-206 containing a list of URLs pointing to the variant's media segments. The encoder also creates a master playlist file, containing a list of the URLs to variant media playlists, and descriptive tags to control the playback behavior of the stream. While producing playlists and segments, the encoder or automated scripts upload the files to a web server or CDN. Access is provided to the content by embedding a link to the master playlist file in a web page, or by creating a custom application that downloads the master playlist file.

In one embodiment, the encoder creates media segments by dividing the event data into short MPEG-2 transport stream files (.ts). Typically, the files contain H.264 video or AAC audio with a duration of 5 to 10 seconds each. The encoder typically allows the user to set the encoding and duration of the media segments, and creates the media playlists as text files saved in the M3U format (.m3u8). The media playlists contain uniform resource locators (URLs) to the media segments and other information needed for playback. The playlist type—live, event, or video on demand (VOD)—determines how the stream can be navigated.

The master playlist provides an address for each individual media playlist in the media program stream. The master playlist also provides important details such as bandwidth, resolution, and codec. The MPP 108 uses that information to decide the most appropriate variant for the device and the currently measured, available bandwidth.

Hence, the master playlist (e.g. masterplaylist.m3u8) include variants of the media program, with each variant is described by a media playlist suitable for different communication channel throughputs. The media playlist includes a list of media segments or "chunks" to be streamed and reproduced, and the address where each chunk may be obtained.

In a specific example, the media playlists includes a media playlist cellular_video.m3u8, having a lower resolution version of the media program suitable for low bandwidth cellular communications channels, a wifi_video.m3u8 having a higher bandwidth version of the media program suitable for higher bandwidth communications channels, and appleTV_video.m3u8 having a high resolution version of the media program suitable for very high bandwidth communications channels). The order of the media playlists in the master playlist does not matter, except that when playback begins, the MPP 108 begins streaming first variant it is capable of playing. If conditions change and the MPP 108 can no longer play that version of the media program, the player switches midstream to another media playlist midstream of lower resolution. If conditions change and the MPP 108 is capable of playing a higher resolution version of the media program, the player switches midstream to the media playlist associated with that higher resolution version.

Referring back to FIG. 1, the MPP 102 transmits a media program request 114 to the CDN 104, and in response, receives a master playlist 116. Using the master playlist, the MPP 108 selects a version of the media program (typically the version that is first on the master playlist) and requests the media (segment) playlist 120 associated with that version of the media program. The MPP 108 recites the media playlist 120, and using the media playlist 120, transmits segment requests 122 for the desired media program segments. The media server 110 retrieves the media program segments 124 and provides them to the MPP 108, where they are received, decoded, and rendered.

Figure 3:
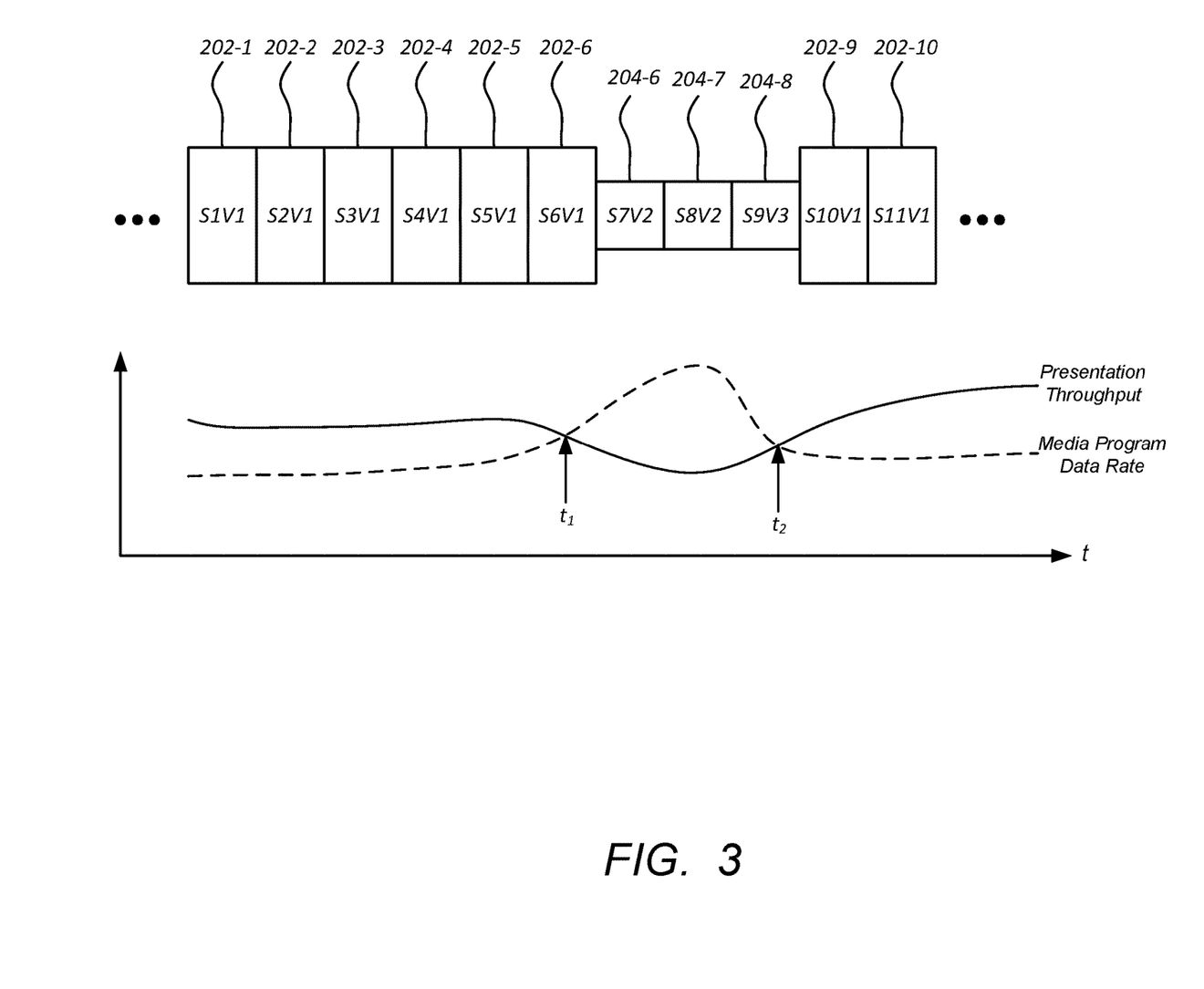
FIG. 3 is a diagram illustrating one example of the streaming of segments of a media program using the HLS protocol.

FIG. 3 is a diagram illustrating one example of the streaming of segments of a media program using the HLS protocol. Modern video compression schemes such as MPEG result in frames or series of frames having a more data than other frames or series of frames. For example, a scene of a media program may depict a person or object against a smooth (spatially substantially unchanging) and/or constant (temporally substantially unchanging) background. This may happen, for example if the scene is comprised of a person speaking. Such scenes typically require less data than other scenes, as the MPEG compression schemes can substantially compress the background using spatial and temporal compression techniques. Other scenes may depict a spatially and temporally complex scene (for example, a crowd in a football stadium) that cannot be as substantially compressed. Consequently, the size of the data that needs to be communicated to the MPP 108 and decoded and rendered by the MPP 108 varies substantially over time, as shown in FIG. 3. At the same time, the presentation throughput (the throughput of the communication channel combined with the computational throughput of the MPP 108 in decoding and rendering the media program) also changes over time. Since more complex frames may require more processing to decode and render, the processing throughput of the MPP 108 can be inversely related to the media program data rate, with processing throughput (and hence, the presentation throughput) becoming lower when the media program data rate is highest.

To account for this, the MPP 108 refers to the master playlist to find a media playlist of segments more suitable for the presentation throughput, retrieves this media playlist, and using the media playlist, requests segments of the appropriate type and size or the presentation throughput and the media program data rate. In the example presented in FIG. 3, the MPP 108 has requested media program segments 202 1 through 202-6 from a first media playlist. Media program segments 202-1 through 202-5 are received, decoded, and rendered with no degradation of quality, as the media program data rate remains less than the presentation throughput. However, at time $t_1$, the media program data rate rises and the presentation throughput falls to the point where the quality of playback is no longer as desired. At this point, the MPP 108 detects the inadequate presentation throughput and consults the master playlist to find a media playlist for a "lighter" (e.g. smaller in size and/or easier to perform the presentation processing) version of the media program. The MPP 108 uses the master playlist 116 to transmit a media program version request 118' for a media segment playlist 120' of media program segments of that can be received and presented with adequate quality. In the illustrated embodiment, this is version 2 of the media program. The MPP 108 receives this media playlist 120' and uses the playlist to select the required media program segments. Since segments 1-6 have already been provided, the MPP 108 transmits a segment request 122 for media program segments of version two of the media program beginning with segment seven, S7V2 204-6. The MPP 108 continues to request version two of the media program, so long as the media program data rate exceeds the available presentation throughput. Similarly, at time $t_2$, the MPP 108 detects that the available presentation throughput exceeds the media program data rate, and using analogous procedures to those described above, requests segments 10 and 11 of the first version of the media program.

FIGS. 4A-4H are diagrams depicting an exemplary process to receive and process media programs. In block 402, a request is transmitted for a media program to the CDN or MPP 104. In block 404, a master playlist is received by the MPP 108. The master playlist 116 comprises an index to a plurality of media playlists. Each such media playlist 120 comprises an address to each of a plurality of media program segments of a related variant of the media program suitable for a first presentation throughput, wherein the first presentation throughput comprises a first communication throughput and a first processing throughput. Communication throughput includes to the throughput (e.g. in MB/second) of the communication channel that is used to transmit/receive the media program segments but does not include MPP 108 processing. Processing throughput includes the processing performed at the MPP 108 to decode and render the media program segments for presentation, but does not include communication throughput.

Figure 4A:
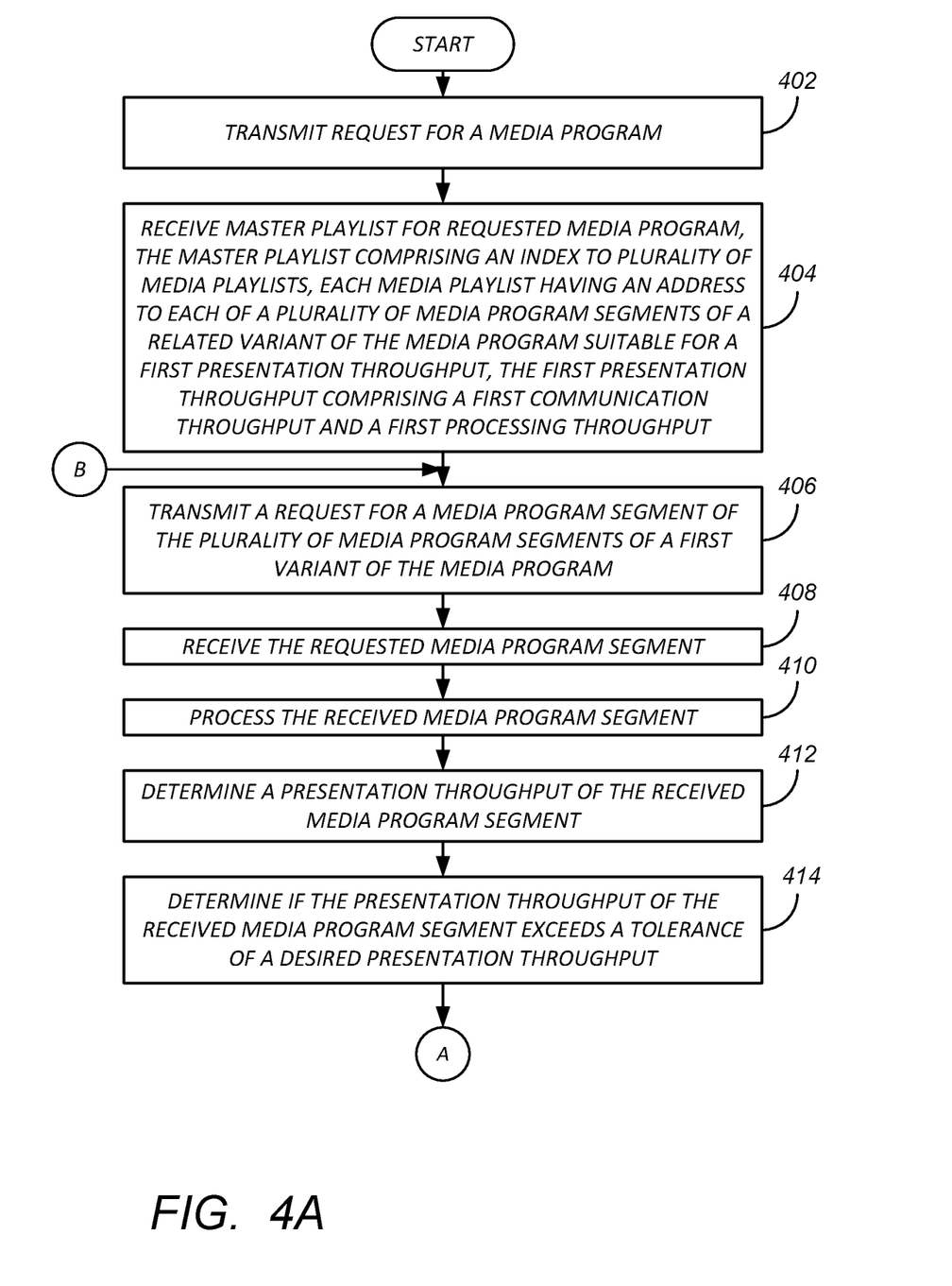
FIGS. 4A-4H are diagrams depicting an exemplary process to receive and process media programs.

In block 406, a request 122 is transmitted for a media program segment 124 of the plurality of media programs of a first variant of the media program. The request 122 is transmitted to the media server 110 and includes an address (e.g. URL) from which the media program segment is obtained.

In block 408, the media segment is received via communication path 115. Note that the segment requests 122 and/or segments 124 may be transceived via a different communication channel 115 with different throughput or bandwidth than the communication channel 146 used to transmit and receive program requests 114, master playlists 116, media program version requests 118, and media playlists 120.

In block 410, the received media program segment is processed to decode and render the media program segment. In block 412, the presentation throughput of the received media program segment is determined.

As described above, the presentation throughput may be limited by the network throughput or bandwidth in the transmission of the media program segment to the MPP 108, by the processing throughput in decoding and rendering the media program, or by both factors. Network throughput may be expressed in terms of bandwidth, for example, megabits per second, or using other related metrics such as time between the request for a media program segment until the entire media program segment has been delivered. Such time may depend on the bandwidth of the communications link(s) 115 and/or processing by the MPP 104 or the media server 110. Processing throughput refers to the ability of the MPP 108 to decode a received and render a media program segment.

Figure 4B:
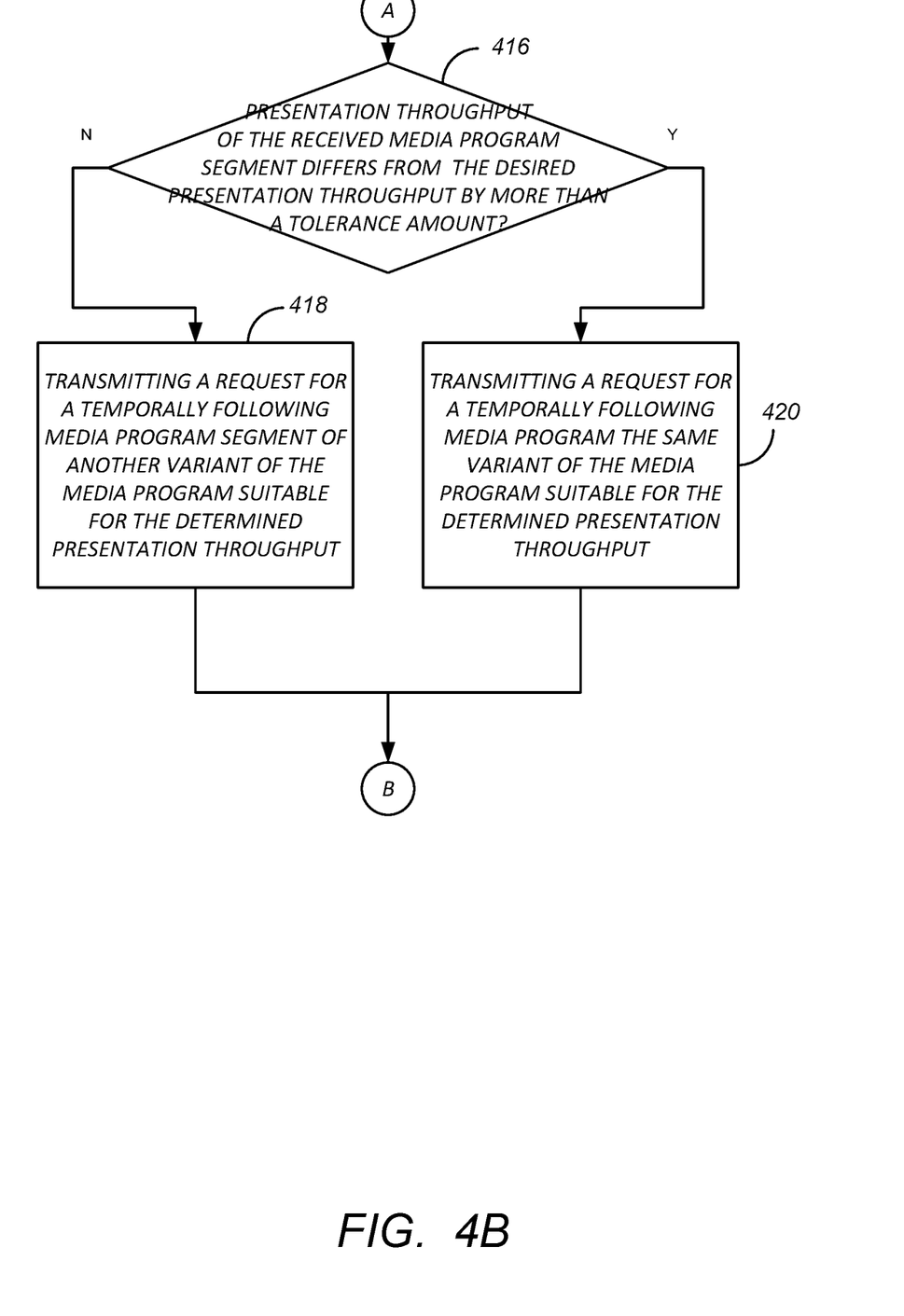
Figure 4C:
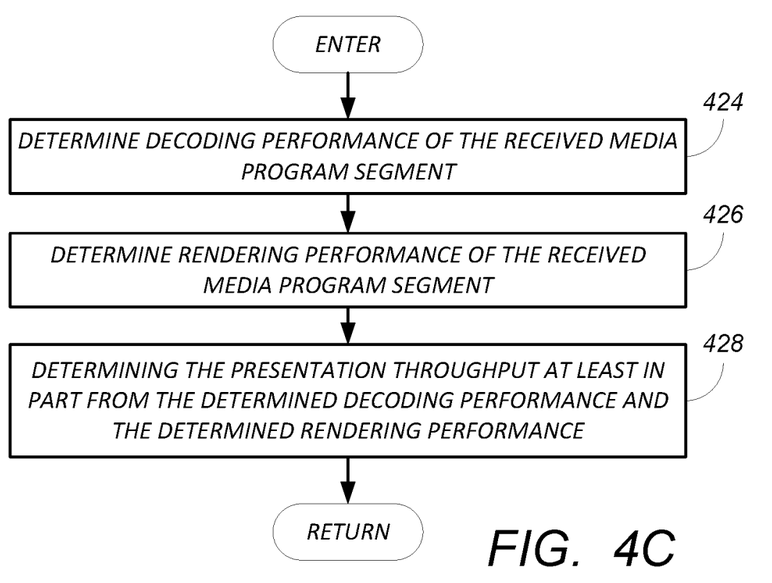

FIG. 4C is a diagram illustrating one embodiment of how processing throughput is determined. In block 424, the decoding performance of the received media program segment is determined (e.g. measured or estimated). In block 426, the rendering performance of the received media program segment is determined (typically on a frame by frame basis, as the frames are decoded). Finally, in block 428, a measure of the presentation throughput is determined at least in part from the determined decoding performance and the determined rendering performance. Techniques for performing these operations are discussed more fully below.

In block 414, the MPP compares the presentation throughput with the desired presentation throughput to determine if the presentation throughput computed for the media program segment 124 differs from the desired presentation throughput by more than a tolerance amount.

Turning to FIG. 4B, block 416 routes processing based upon the determination made in block 414. If the presentation throughput of the received media program segment is less than the desired presentation throughput, block 416 routes processing to block 418. Block 418 transmits a request for a temporally following media program segment (e.g. the next media program segment to be received, processed and presented). In this case, the requested media program segment is of another variant of the currently presented media program segment. If the determined presentation throughput is less than the desired presentation throughput by greater than the tolerance value, a "lighter" variant that that is more readily received and processed. Typically, this is a media program segment depicting the temporal portion of the media program in lower resolution, fewer colors, a lower frame rate or any of these factors. As such a media program segment can be more rapidly received and processed, the presentation throughput of the media program for this media program segment will be higher than the previous media program segment. If the processing of block 418 determines that the presentation throughput of the received media program is greater than the tolerance of the desired presentation throughput, block 418 may optionally transmit a "heavier" variant of the next media program segment. Typically, this is a media program segment depicting the temporal portion of the media program in higher resolution, more colors, higher lower frame rate, or any of these factors. As such a media program segment takes more processing and processing time, but since extra presentation throughput is available, this "heavier" media program segment may be selected for a better viewing experience.

In one embodiment, rather than request a different variant of the immediately following media program segment (for example, media program segment 204-6 illustrated in FIG. 3), a change to request media program segments for different versions of the media program may be made only after a determination is made that the presentation throughput is less than the desired presentation throughput for more than one number of segments. This embodiment may result in a system that is less responsive to changes the communication and/or processing throughput, but may improve the viewability of the media program.

If the presentation throughput of the received media program is within the desired presentation throughput, block 416 routes processing to block 420, which transmits a request for the temporally following media program segment of the same variant of the media program. The tolerance (e.g. how close the determined presentation throughput needs to match the desired presentation throughput in order to request a media program segment of the same version as the previous version) depends a number of factors. Allowing for larger differences between the desired and actual presentation throughput before requesting different media program versions permits small presentation errors and delays to be overlooked, while more significant presentation delays are addressed by requesting different versions of the media program segments. In one embodiment, transitions to requesting lower resolution versions of the media program are made more rapidly (e.g. after the presentation throughput of only a single media program segment version has been found to be inadequate) than requesting higher resolutions of the media program (e.g. only after the presentation throughput of a plurality of media program segment versions has been found to be inadequate).

Decoding Performance

Figure 4D:
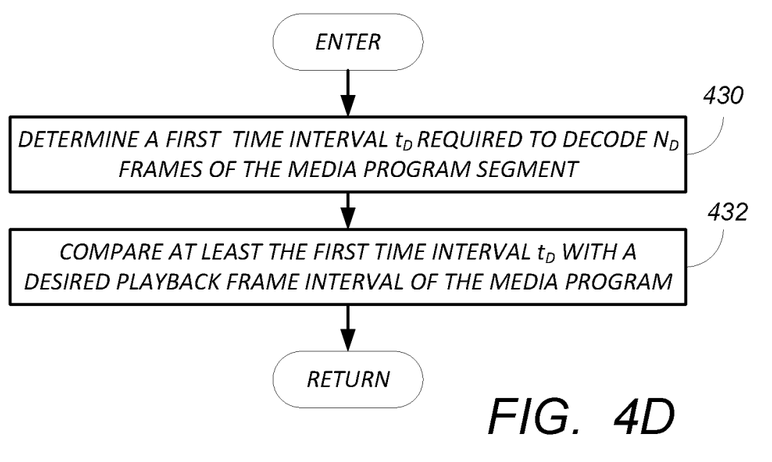

FIG. 4D is a diagram illustrating one embodiment of how the decoding performance of the received media program may be determined. In block 430, a first time interval $t_D$ required to decode a number of frames $N_D$ is determined. This value is then used to determine if the presentation throughput is more, less or approximately equal to the desired presentation throughput by a comparison with the desired playback frame interval of the media program, as shown in block 432.

The operation of blocks 430 and 432 can be performed by measuring the time it takes to decode individual frames, computing a decoding rate (for example in number of frames decoded per second, or fps) and comparing the computed frame decoding rate to a desired presentation rate. For example, an indication of the frame rate of a version of the media program may be included in the master playlist, media playlist, or metadata in the segment itself. This media program frame rate can be compared to the decoding frame rate to determine if the decoding frame rate is sufficient to adequately decode the media program for presentation. For example, if the frame rate stated in the master playlist of media playlist is 30 fps, each frame must be decoded in 1/30 of a second or less, or a frame will be skipped, compromising playback. Accordingly, if the decoding of $N_D$=6 frames takes longer than $t_D$=0.20 seconds, the MPP 108 will determine that the decoding performance is inadequate, and request "lighter" version of the temporally next media program segment so that the decoding performance is improved.

Figure 4E:
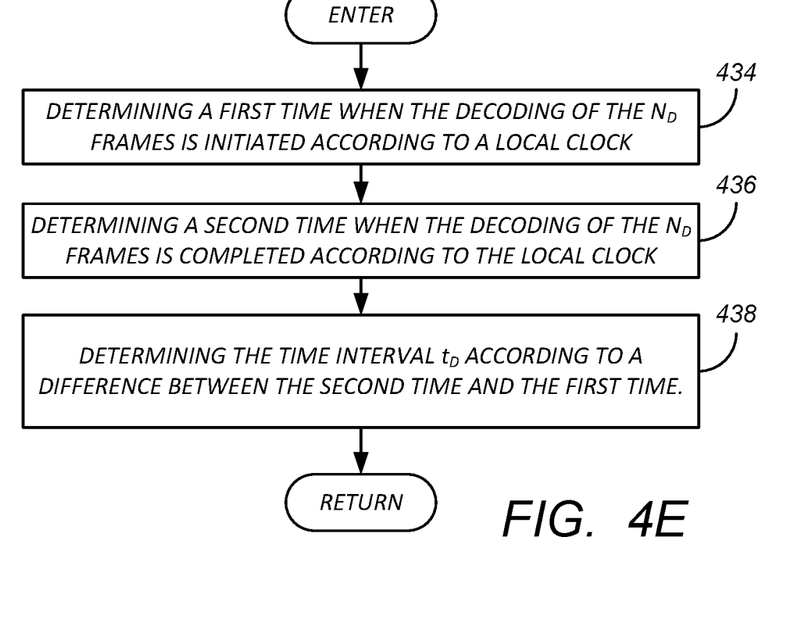

FIG. 4E is a diagram illustrating how the time interval $t_D$ required to decode $N_D$ frames may be determined. In block 434, a first time is determined when the decoding of the $N_D$ frames is initiated according to a clock such as a local clock in the MPP 108. In block 436, a second clock time is determined when the decoding of the $N_D$ frames is completed and emerges from the decoder according to the clock. In block 438, the time interval $t_D$ is determined according to a difference between the second clock time and the first clock time.

The size and complexity of frames to be decoded can vary substantially from frame to frame. Hence, it is advantageous to determine the decoding performance over a number of frames. For example, the average decode rate in frames/second may be determined using a greater number of frames (e.g. 60-90 frames). In one embodiment, the number of frames is chosen to comprise a third to a half of a chunk, so that the frame rate can be computed and compared to the desired frame rate with adequate time to request a segment of a different version of the media program. In one embodiment, for example, the number of frames $N_D$ over which to compute the decoding frame rate is:

$$\frac{T_S \times R_F}{\alpha_f}$$

where $T_S$ is the media program segment temporal length (in seconds), $R_F$ is the desired frame rate (obtained from the master playlist, media playlist, or metadata) in frames per second, and $a_f$ is a dimensionless lead factor between two and three. For example, if media program segments are 10 seconds long, and the media program frame rate is 30 fps, a lead factor of two will result the decode rate being averaged over in $N_D$=150 frames.

Rendering Performance

Figure 4F:
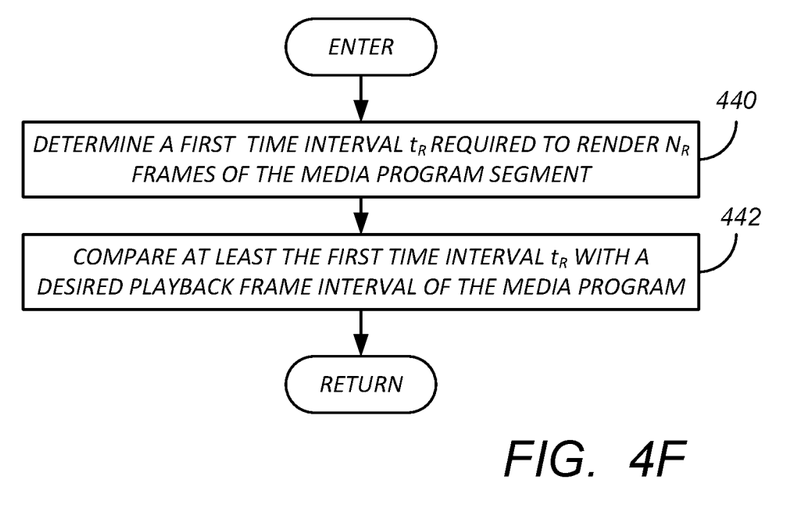
Figure 4G:
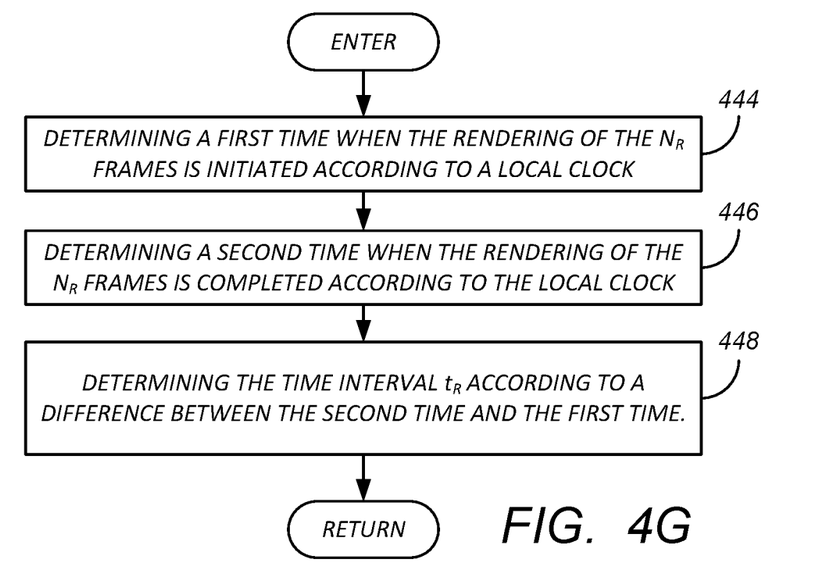

FIG. 4F is a diagram illustrating one embodiment of how the operations of block 426 (measuring the rendering performance of the received media program segment) is accomplished. In block 440, a first time interval $t_R$ required to render $N_R$ frames of the media program segment. This cam be accomplished as illustrated in FIG. 4G. In this embodiment, a first time when rendering of the NR frames is initiated is determined, for example, from a local or system clock when the decoded frame is provided for rendering. This is shown in block 444. A second time is then determined when the rendering of the $N_R$ frames is completed, as shown in block 446. This can be accomplished by use of the same local or system clock. Then, as shown in block 448, the time interval $t_R$ needed to render the $N_R$ frames is determined. Returning to FIG. 4F, this computed time interval $t_R$ is compared with a desired playback frame interval (for example, $1/R_F$) to determine whether the presentation throughput is more, less or approximately equal to the desired presentation throughput, as shown in block 442.

Presentation throughput can also be defined in terms of the combination of the performance of the decoding and rendering of each frame or plurality of frames of the media program segment. In this case, the operations of block 414 in determining if the presentation throughput of the received media segment is less than, greater than, or approximately equal to a desired presentation throughput can be determined by averaging both decode and rendering performance across one or more frames. For example, the time interval between initiating the decoding process of a first frame of a plurality of frames and the completion of the rendering of the plurality of frames can be computed and compared to the desired playback frame interval.

The foregoing techniques demonstrate how decoding and rendering performance of a media program segment can be determined and used to determine which versions of the temporally subsequent media program segment to request. The decoding and rendering performance can also be estimated and/or predicted, with the predictions used to determine which versions to request. For example it is typical for computing device operating systems to provide information regarding processing performance and capacity. For example, computers operating with MICROSOFT's WINDOWS operating system are capable of determining the current and historical usage of processor and memory resources (CPU, disk reads and writes, local network utilization, physical memory use), as well as which applications and processes are operational. Such information can be used to predict the processing throughput. For example, the number and characteristics of applications currently being executed by the device implementing the MPP 108, as well as scheduled processing events such as software updates and backups can be used to predict processing throughput. As rendering is often performed by a dedicated processor (GPU) for that purpose, such changes may not affect rendering throughput. Accordingly, where predicted processing throughput is utilized, a separate determination of decoding and rendering performance can be particularly advantageous.

Playback Performance

Another technique for determining whether the presentation throughput of the received media program segment is less than the desired presentation throughput is to determine if playback of any of the frames of the media program has stalled or if any of such frames has not been decoded, rendered, and provided for display. This typically occurs when the decoder 126 cannot decode frames sufficiently quickly, and a decoded frame is not available for rendering at the expected time. The renderer 128 may include a thread that measures the time elapsed between frames provided by the decoder 126, and if the time is greater than the expected frame rate, determine that the decoder 120 has stalled and is not producing decoded frames at the required rate. Or, the MPP 108 or renderer 128 may simply note that the time for the decoder 126 to provide a decoded frame has passed, and a decoded frame has not been provided for rendering by the decoder 126.

Still another technique for determining whether the presentation throughput of the received media program segment is to use the transport data included in the coded frames to determine if frames have been dropped. The Motion Pictures Experts Group (MPEG) standard includes a presentation time stamp (PTS) that is included in the MPEG transport stream or program stream. The PTS is used to synchronize elementary streams (e.g. video and audio) using a clock reference such as the program clock reference (PCR) or system clock reference (SCR) transmitted in the same stream. The PTS indicates the instant at which a frame should be presented for display. The MPEG standard also describes a decode time stamp (DTS) that indicates the time at which an encoded frame should be removed from a buffer of the receiver 102 and presented to the decoder 126 for decoding.

Also, rapidly fluctuating between bitrates also presents an undesirable user experience. In still another embodiment, the MPP 108 monitors how quickly new bitrates are being selected and selects a bitrate that prevents rapid fluctuation. By considering other contributing factors and monitoring ongoing playback performance we can deliver a quality playback experience across a wider array of systems.

Figure 4H:
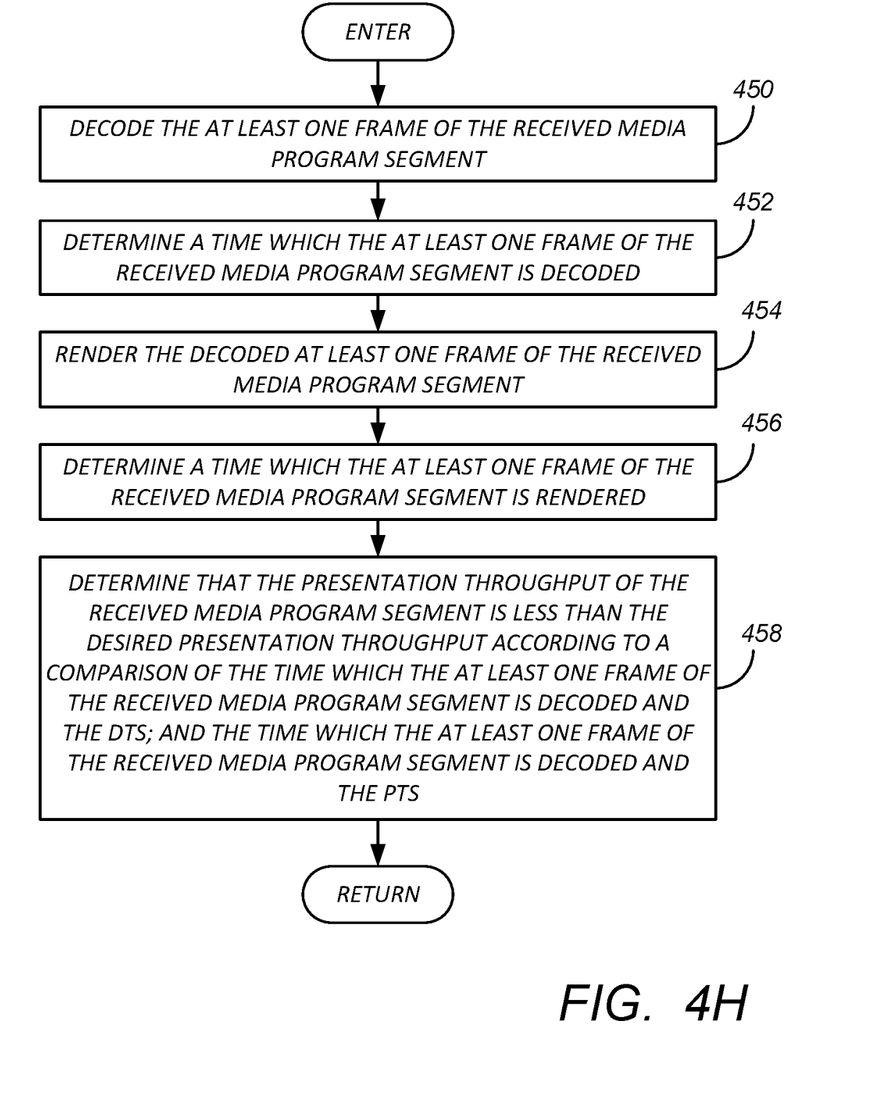

FIG. 4H is a diagram illustrating one embodiment of the use of the PTS and DTS in the relationship between the presentation throughput and the desired presentation throughput. In block 450, at least one frame of the received media program segment is decoded. In block 452, a time is determined at which at least one frame of the received media program segment is decoded. In block 454, the decoded at least one frame is rendered. In block 456, the time at which the at least one frame of the decoded frame of the media program segment has been rendered is determined. Finally, block 458 determines whether the presentation throughput of the received media program segment is more, less or approximately equal to the desired presentation throughput according to a comparison of the time at which the at least one frame of the received media program segment is decoded and the DTS, and the time at which the at least one frame of the received media program segment is rendered and the PTS. The difference between the time at which the at least one frame of the received media program segment is decoded and the DTS gives an estimate or measurement of the decode time, and the difference between the time at which the at least one frame of the received media program segment is rendered and the PTS provides an estimate or measurement of the presentation time. While the foregoing computations can be completed on a frame-by-frame basis, such computations may also be performed across multiple frames or multiple media program segments.

Hardware Environment

Figure 5:
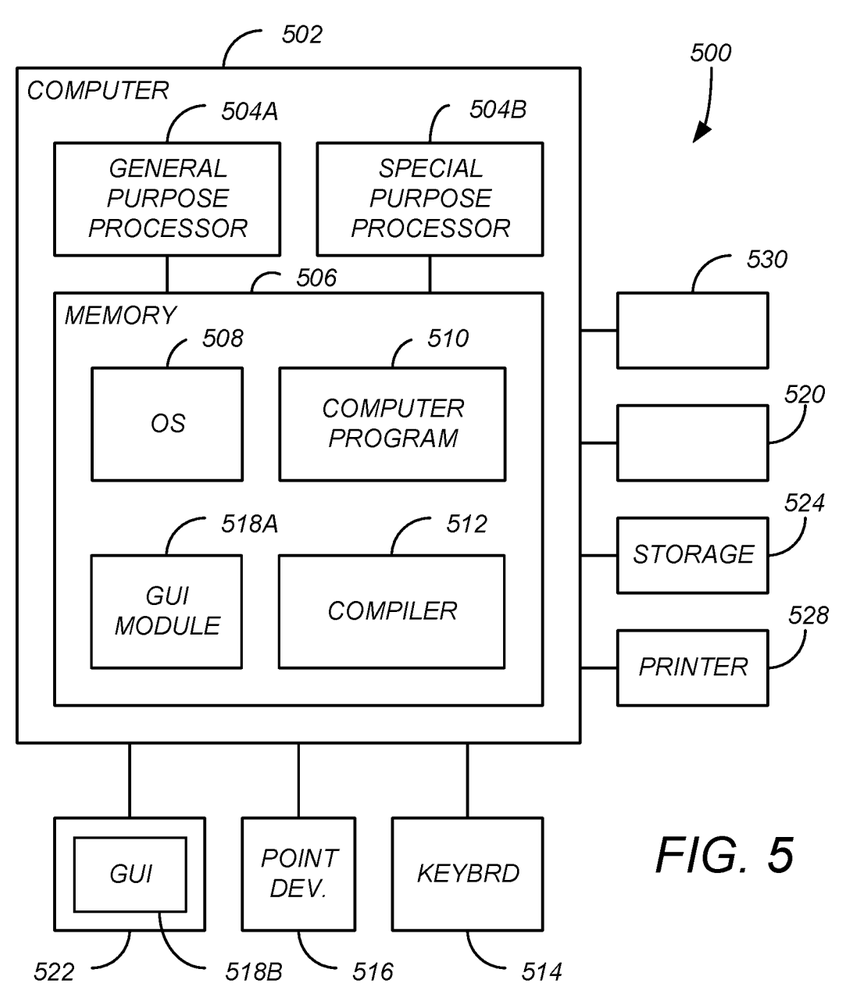
FIG. 5 illustrates an exemplary system that could be used to implement processing elements of the content distribution system.

FIG. 5 illustrates an exemplary computer system 500 that could be used to implement processing elements of the above disclosure, including the receiver 102, media program player 108, interface module 106, media program provider 104, and media server 110. The computer 502 comprises a processor 504 (e.g. general purpose processor 504A and/or special purpose processor 504B) and a memory, such as random access memory (RAM) 506. The computer 502 is operatively coupled to a display 522, which presents images such as windows to the user on a graphical user interface 518B. The computer 502 may be coupled to other devices, such as a keyboard 514, a mouse device 516, a printer 528, etc. Of course, those skilled in the art will recognize that any combination of the above components, or any number of different components, peripherals, and other devices, may be used with the computer 502.

Generally, the computer 502 operates under control of an operating system 508 stored in the memory 506, and interfaces with the user to accept inputs and commands and to present results through a graphical user interface (GUI) module 518A. Although the GUI module 518B is depicted as a separate module, the instructions performing the GUI functions can be resident or distributed in the operating system 508, the computer program 510, or implemented with special purpose memory and processors. The computer 502 also implements a compiler 512 which allows an application program 510 written in a programming language such as COBOL, C++, FORTRAN, or other language to be translated into processor 504 readable code. After completion, the application 510 accesses and manipulates data stored in the memory 506 of the computer 502 using the relationships and logic that was generated using the compiler 512. The computer 502 also optionally comprises an external communication device such as a modem, satellite link, Ethernet card, or other device for communicating with other computers.

In one embodiment, instructions implementing the operating system 508, the computer program 510, and the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of instructions which, when read and executed by the computer 502, causes the computer 502 to perform the operations herein described. Computer program 510 and/or operating instructions may also be tangibly embodied in memory 506 and/or data communications devices 530, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of receiving and processing a media program, the media program comprising a plurality of media program versions, each of the plurality of media program versions generated for a different presentation throughput than the other of the plurality of media program versions, each of the plurality of media program versions comprising a plurality of media program version segments, the method comprising:
transmitting a request for the media program;
receiving a master playlist for the requested media program, the master playlist comprising an index to plurality of media playlists, each media playlist having an address to each of a plurality of media program segments of a related variant of the media program suitable for a first presentation throughput, the first presentation throughput comprising a first communication throughput and a first processing throughput;
transmitting a request for a media program segment of the plurality of media program segments of a first variant of the media program;
receiving the requested media program segment;
processing the received media program segment;
determining a presentation throughput of the received media program segment, comprising:
  determining a decoding performance of the received media program segment;
  determining a rendering performance of the received media program segment; and
  determining the presentation throughput at least in part from the determined decoding performance and the determined rendering performance;
determining if the presentation throughput of the received media program segment differs from a desired presentation throughput by more than a tolerance amount;
  if the determined presentation throughput of the received media program segment differs from the desired presentation throughput by more than a tolerance amount, transmitting a request for a temporally following media program segment of another variant of the media program suitable for the determined presentation throughput; and
  if the determined presentation throughput of the received media program segment differs from the desired presentation throughput by more than a tolerance amount, transmitting a request for a temporally following media program segment of the variant of the media program suitable for the determined presentation throughput; wherein
the step of determining the decoding performance of the received media program segment comprises determining a first time interval $t_D$ required to decode $N_D$ frames of the media program segment by: (i) determining a first time when the decoding of the $N_D$ frames is initiated according to a local clock; (ii) determining a second time when the decoding of the $N_D$ frames is completed according to the local clock; and (iii) determining the time interval $N_D$ according to a difference between the second time and the first time; and
the step of determining if the presentation throughput of the received media program segment differs from the desired presentation throughput by more than a tolerance amount comprises comparing at least the determined first time interval $t_D$ with a desired playback frame interval of the media program.

2. The method of claim 1, wherein the desired playback frame interval is specified in the master playlist.

3. The method of claim 1, wherein $N_D \geq 2$.

4. The method of claim 3, wherein:

$$N_D = \frac{T_S \times R_F}{\alpha_f}$$

wherein $T_S$ is a temporal length of the media program segment, $R_F$ is a desired frame rate, and $\Box_f$ is a dimensionless lead factor between two and three.

5. The method of claim 1, wherein:
determining the rendering performance of the requested media program segment comprises:
  measuring a second time interval $t_R$ required to render $N_R$ frames of the media program segment;
determining if the presentation throughput of the received media program segment differs from the desired presentation throughput by more than a tolerance amount comprises:
  comparing a sum of the determined first time interval $t_D$ and the determined second time interval $t_R$ with the desired playback frame interval of the media program.

6. The method of claim 5, wherein
determining the second time interval required to decode $N_R$ frames of the media program segment comprises:
  determining a third time when the decoding of the $N_R$ frames is initiated according to a local clock;
  determining a fourth time when the decoding of the $N_R$ frames is completed according to the local clock; and
  determining the time interval $t_R$ according to a difference between the second time and the first time.

7. The method of claim 6, wherein $N_R \geq 2$.

8. The method of claim 7, wherein:

$$N_R = \frac{T_S \times R_F}{\alpha_f}$$

wherein $T_S$ is a temporal length of the media program segment, $R_F$ is a desired frame rate, and $\Box_f$ is a dimensionless lead factor between two and three.

9. The method of claim 1, wherein:
determining if the presentation throughput of the received media program segment is within the tolerance of the desired presentation throughput comprises:
  determining a time interval between decoded frames provided from a decoder for rendering;
  if the time interval between decoded frames provided for rendering exceeds a maximum time interval, determining that the presentation throughput differs from the desired presentation throughput by more than the tolerance amount.

10. The method of claim 1, wherein:
at least one frame of the received media program segment comprises a presentation time stamp (PTS) and a decoding time stamp (DTS), and
determining if the presentation throughput of the received media program segment differs from the desired presentation throughput by more than a tolerance amount comprises:
  decoding the at least one frame of the received media program segment;
  determining a time which the at least one frame of the received media program segment is decoded;
  rendering the decoded at least one frame of the received media program segment
  determining a time which the at least one frame of the received media program segment is rendered;
  determining that the presentation throughput of the received media program segment differs from the desired presentation throughput by more than the tolerance amount according to a comparison of:
    the time which the at least one frame of the received media program segment is decoded and the DTS; and
    the time which the at least one frame of the received media program segment is rendered and the PTS.

11. An apparatus for receiving and processing a media program, the media program comprising a plurality of media program versions, each of the plurality of media program versions generated for a different presentation throughput than the other of the plurality of media program versions, each of the plurality of media program versions comprising a plurality of media program version segments, the apparatus comprising:
  a processor; and
  a memory, communicatively coupled to the processor, the memory storing processor instructions comprising processor instructions for:
    transmitting a request for the media program;
    receiving a master playlist for the requested media program, the master playlist comprising an index to plurality of media playlists, each media playlist:
      having an address to each of a plurality of media program segments of a related variant of the media program suitable for a first presentation throughput, the first presentation throughput comprising a first communication throughput and a first processing throughput;
    transmitting a request for a media program segment of the plurality of media program segments of a first variant of the media program;
    receiving the requested media program segment;
    processing the received media program segment;
    determining a presentation throughput of the received media program segment, comprising:
      determining a decoding performance of the received media program segment;
      determining a rendering performance of the received media program segment; and
      determining the presentation throughput at least in part from the determined decoding performance and the determined rendering performance;
    determining if the presentation throughput of the received media program segment differs from a desired presentation throughput by more than a tolerance amount;
    if the determined presentation throughput of the received media program segment differs from the desired presentation throughput by more than a tolerance amount, transmitting a request for a temporally following media program segment of another variant of the media program suitable for the determined presentation throughput; and
    if the determined presentation throughput of the received media program segment differs from the desired presentation throughput by more than a tolerance amount, transmitting a request for a temporally following media program segment of the variant of the media program suitable for the determined presentation throughput; wherein
  the step of determining the decoding performance of the received media program segment comprises determining a first time interval $t_D$ required to decode $N_D$ frames of the media program segment by: (i) determining a first time when the decoding of the $N_D$ frames is initiated according to a local clock; (ii) determining a second time when the decoding of the $N_D$ frames is completed according to the local clock; and (iii) determining the time interval $N_D$ according to a difference between the second time and the first time; and the step of determining if the presentation throughput of the received media program segment differs from the desired presentation throughput by more than a tolerance amount comprises comparing at least the determined first time interval $t_D$ with a desired playback frame interval of the media program.

12. The apparatus of claim 11, wherein the desired playback frame interval is specified in the master playlist.

13. The apparatus of claim 11, wherein:

$$N_D = \frac{T_S \times R_F}{\alpha_f}$$

wherein $T_S$ is a temporal length of the media program segment, $R_F$ is a desired frame rate, and $\square_f$ is a dimensionless lead factor between two and three.

14. The apparatus of claim 11, wherein:

determining the rendering performance of the requested media program segment comprises:
  determining a second time interval $t_R$ required to render $N_R$ frames of the media program segment, comprising:
    determining a third time when the decoding of the $N_R$ frames is initiated according to a local clock;
    determining a fourth time when the decoding of the $N_R$ frames is completed according to the local clock; and
    determining the time interval $t_R$ according to a difference between the second time and the first time;

determining if the presentation throughput of the received media program segment differs from the desired presentation throughput by more than a tolerance amount comprises:
  comparing a sum of the determined first time interval $t_D$ and the determined second time interval with the desired playback frame interval of the media program;

wherein:

$$N_R = \frac{T_S \times R_F}{\alpha_f},$$

wherein $T_S$ is a temporal length of the media program segment, $R_F$ is a desired frame rate, and $\square_f$ is a dimensionless lead factor between two and three.

15. The apparatus of claim 11, wherein:

determining if the presentation throughput of the received media program segment differs from the desired presentation throughput by more than a tolerance amount comprises:
  determining a time interval between decoded frames provided from a decoder for rendering;
  if the time interval between decoded frames provided for rendering exceeds a threshold, determining that the presentation throughput differs from the desired presentation throughput by more than the tolerance amount.

* * * * *